Nov. 10, 1964  H. L. BARNEY ETAL  3,156,316
METHOD OF AND APPARATUS FOR AUTOMATICALLY MEASURING
SOUND TRANSMISSION CHARACTERISTICS OF A ROOM
Filed Nov. 1, 1960  3 Sheets-Sheet 1

INVENTORS H. L. BARNEY
M. B. GARDNER
BY
ATTORNEY

INVENTORS  H. L. BARNEY
M. B. GARDNER
BY G. E. Hirsch Jr.
ATTORNEY

United States Patent Office 3,156,316
Patented Nov. 10, 1964

3,156,316
METHOD OF AND APPARATUS FOR AUTOMATI-
CALLY MEASURING SOUND TRANSMISSION
CHARACTERISTICS OF A ROOM
Harold L. Barney, Madison, and Mark B. Gardner, Chatham Township, Morris County, N.J., assignors to Bell Telephone Laboratories, Incorporated, New York, N.Y., a corporation of New York
Filed Nov. 1, 1960, Ser. No. 66,597
11 Claims. (Cl. 181—.5)

This invention relates in general to the determination of the acoustic characteristics of rooms, and in particular to the measurement of the frequency irregularity between arbitrarily selected points in rooms.

It was pointed out by E. C. Wente in "The Characteristics of Sound Transmission in Rooms," Volume 7, Journal of the Acoustical Society of America, page 123 (1935), that important acoustic properties of rooms may be determined from the fluctuations in sound pressure at one arbitrarily selected point in a room due to sound waves of various frequencies generated at another arbitrarily selected point in the same room. From the fluctuations in sound pressure, Wente defined a quantity known as transmission irregularity, derived by taking the difference between the sum of all the maxima of the sound pressure fluctuations, in decibels, and the sum of all the minima of the sound pressure fluctuations, in decibels. Thus defined, the magnitude of the transmission irregularity is a function of both the frequency and the maximum and minimum amplitudes of the logarithm of fluctuations in sound pressure. Subsequently, R. H. Roop and R. W. Bolt in "Frequency Response Fluctuations in Rooms," Volume 22, Journal of the Acoustical Society of America, page 280 (1950), defined frequency irregularity as transmission irregularity divided by the frequency range of the generated sound waves. Since transmission irregularity and frequency irregularity differ by only a constant for a given frequency range, only frequency irregularity will be discussed hereinafter.

By measuring the frequency irregularity between two points in a room, an indication of the acoustic properties of a room as a whole is obtained; for example, frequency irregularity provides an indication of the reverberation characteristics of a room. Equally important, frequency irregularity is an accurate indicator of the efficiency of the sound transmission path between two points in a room. In the field of hands-free telephony, for example, the frequency irregularity of the speech transmission path between the subscriber and the transmitting microphone, and the frequency irregularity of the speech transmission path between the receiving loudspeaker and the subscriber, are significant factors in determining the optimum location for a hands-free telephone installation at a subscriber's station. Measurement of frequency irregularity, however, has required either time-consuming manual calculations based upon a graphical record of sound pressure fluctuations or complex and expensive apparatus of the type suggested by L. L. Beranek, Acoustic Measurements, page 828 (1949).

It is a specific object of this invention to provide simple, economical apparatus for computing rapidly and automatically the frequency irregularity between arbitrarily selected points in a room.

In this invention, a sound wave whose frequency is changed at a predetermined constant rate over a preselected frequency range is generated at one point in a room during a predetermined time interval. At a second point in the room, there is derived an electrical wave whose fluctuations in amplitude correspond to the logarithm of the sound pressure fluctuations at the second point in the room caused by the sound wave generated at the first point in the room. The electrical wave is then processed to cause both the frequency of its fluctuations and the differences between its successive maximum and minimum amplitudes to contribute proportionately to the charge stored upon a capacitor. At the end of the predetermined time interval, the total charge stored upon the capacitor is proportional to the frequency irregularity between the two points in the room.

In one embodiment of the principles of this invention, the electrical wave is processed by removing its direct-current component and by equalizing the wave to cause its high-frequency components to contribute more to the charge on the capacitor than its low-frequency components, as required by the definition of frequency irregularity. The equalized wave is then rectified and integrated so that there is accumulated on the capacitor a succession of charges proportional to the difference in amplitude between successive peaks of the electrical wave. The sum of the amplitude differences between successive peaks of the electrical wave is proportional to the difference between the sum of all the maxima of the sound pressure fluctuations and the sum of all the minima of the sound pressure fluctuations. Thus, at the end of the predetermined time interval, the total charge stored upon the capacitor is proportional to the frequency irregularity.

Alternative apparatus for processing the electrical wave causes each maximum amplitude of the wave to store on a first capacitor a charge proportional to the corresponding maximum of the sound pressure fluctuations, and causes the minimum amplitude following each maximum amplitude of the wave to store on a second capacitor an opposite polarity charge proportional to the corresponding minimum of the sound pressure fluctuations. At the termination of each cycle of the electrical wave, each cycle being composed of a maximum amplitude followed by a minimum amplitude, the algebraic sum of the charges on the two capacitors is transferred to a third capacitor. The total of the algebraic sums of each pair of maximum and minimum amplitudes of the electrical wave is proportional to the frequency irregularity of the sound pressure fluctuations; hence at the end of the predetermined time interval, the total charge transferred to the third capacitor is proportional to the frequency irregularity.

The invention will be fully understood from the following detailed description of illustrative embodiments thereof taken in connection with the appended drawings, in which.

Figure 1:
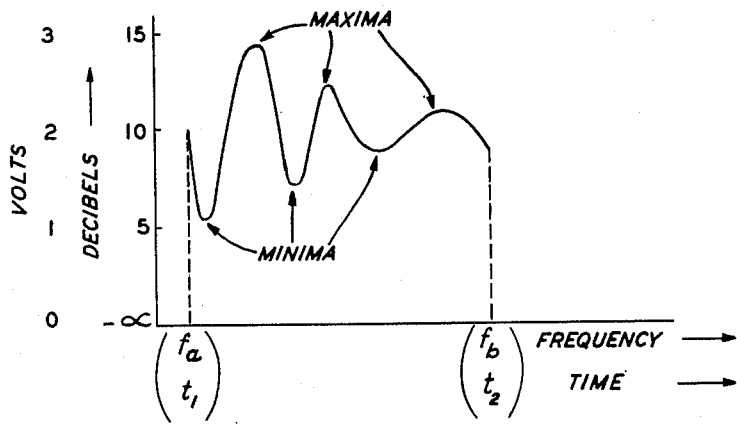
FIG. 1 is a waveform diagram of assistance in explaining the operation of the apparatus of this invention.

With reference to FIG. 1, there is shown a curve representative of typical fluctuations in sound pressure, in decibels, at one arbitrarily selected point in a room due to sound waves of frequencies in the range from $f_a$ to $f_b$ generated at another arbitrarily selected point in the same room. The transmission irregularity, T, between arbitrarily selected points in a room is defined as the difference between the sum of the sound pressure maxima and the sum of the sound pressure minima, $$T = \sum_k p(\max.)_k - \sum_k p(\min.)_k \qquad (1)$$

where $p(\max.)$ is a sound pressure maximum and $p(\min.)$ is a sound pressure minimum. From the associative law of addition, Equation 1 may be rewritten $$T = \sum_k [p(\max.)_k - p(\min.)_k] \qquad (2)$$

The frequency irregularity, F, is defined as the transmission irregularity per unit frequency interval, $$F = \left[\frac{T}{f_b - f_a}\right] \qquad (3)$$

where $f_a$ is the lower frequency limit of the generated sound waves and $f_b$ is the upper frequency limit.

It is noted in the above equations and in FIG. 1 that frequency irregularity is a function of the number of maxima and minima as well as of the magnitudes of the maxima and minima; that is, rapid or high-frequency fluctuations in sound pressure contribute more to frequency irregularity than do slow or low-frequency fluctuations. It is further noted that for a given frequency range $f_b - f_a$, transmission irregularity and frequency irregularity differ by only a constant.

Figure 2:
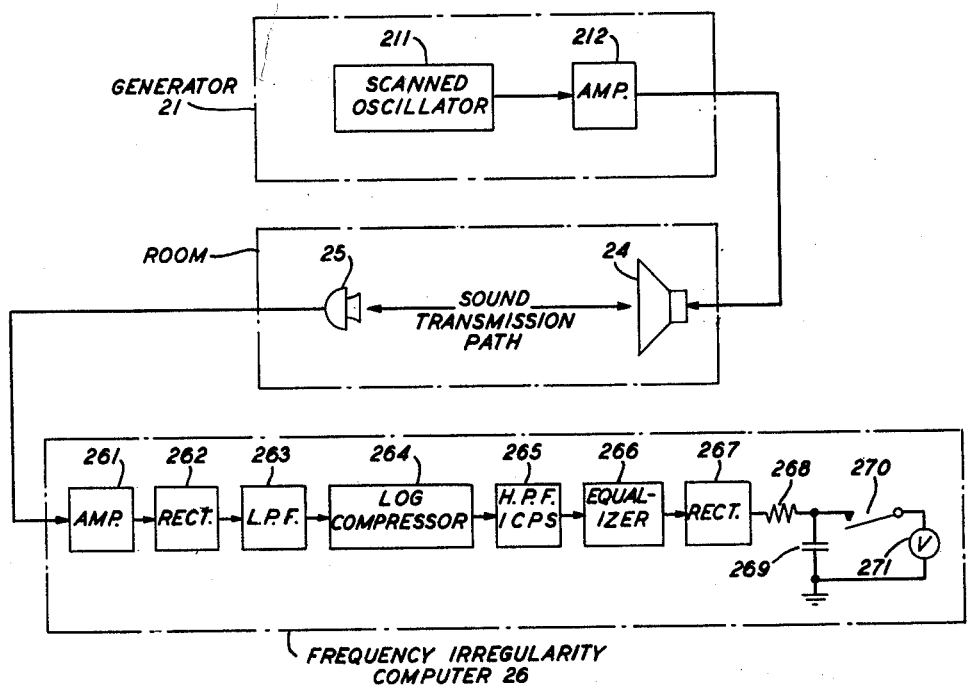
FIG. 2 is a schematic block diagram showing apparatus for computing automatically the frequency irregularity between arbitrarily selected points in a room.

Referring now to FIG. 2, a preferred embodiment of this invention is shown. At one point in a room there is placed a loudspeaker 24, of any desired type, driven by generator 21, consisting of a scanned oscillator 211 and an amplifier 212 connected in series, both of which are of well-known construction. Oscillator 211 is scanned at a constant rate through a preselected frequency range from $f_a$ cycles per second to $f_b$ cycles per second during a predetermined time interval, $t_2 - t_1$. Because of the constant scanning rate, there is a linear or one-to-one correspondence between the frequency range scanned and the time interval during which the frequency range is scanned; hence Equation 3 may be rewritten $$F = \left[\frac{T}{t_2 - t_1}\right] \qquad (4)$$

The output signal of oscillator 211 is magnified by amplifier 212 and converted into sound waves by loudspeaker 24. The scanning rate of oscillator 211 is made slow enough to ensure that sharp fluctuations in sound pressure at the second point in the room are detectable, and loudspeaker 24 has a uniform response over the scanned frequency range. The total frequency range scanned may be a few hundred cycles per second in the vicinity of a thousand cycles per second; for example, a suitable frequency range extends from 900 to 1,100 cycles per second. In determining the optimum location for the installation of a hands-free telephone, the loudspeaker is placed either in the spatial position to be assumed by the subscriber's head during actual use of the telephone, or at the position in which the receiving loudspeaker is to be installed, depending upon which speech transmission path is being measured. In the former position, the directivity of the loudspeaker is made to approximate that of a typical human head and mouth.

At a second point in the room there is placed a conventional pressure microphone 25, to the output terminal of which there is connected frequency irregularity computer 26. For computing the frequency irregularity of the transmission path between the subscriber and the transmitting microphone in a hands-free telephone installation, microphone 25 is placed at the position of the transmitting microphone; for computing the frequency irregularity of the transmission path between the receiving loudspeaker and the subscriber, microphone 25 is placed at a spatial position corresponding to the usual position of the subscriber's head. Microphone 25 develops at its output terminal electrical signals in response to sound pressure fluctuations at the second point in the room. The electrical signals thus developed are passed through amplifier 261, rectifier 262, low-pass filter 263, and logarithmic compressor 264, all of which are of well-known design, to obtain an electrical wave whose amplitude in volts at a given instant in time is proportional to the sound pressure amplitude in decibels at the second point in the room due to a sound wave of a particular frequency generated at that instant at the first point in the room. The electrical wave appearing at the output terminal of logarithmic compressor 264 thus has the same shape as the sound pressure curve shown in FIG. 1, where the ordinate of the electrical wave is measured in volts and the abscissa is measured in units of time. Since the frequency of the generated sound wave is changed at a constant rate, the time scale of the abscissa of the electrical wave is in one-to-one correspondence with the frequency scale of the abscissa of the sound pressure curve.

Figure 3:
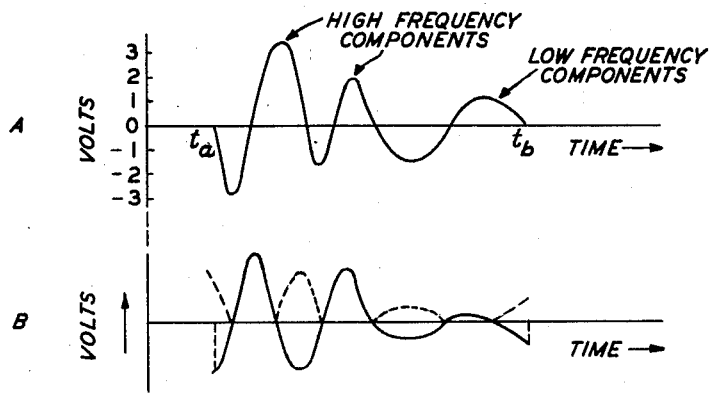
FIG. 3 is a group of waveform diagrams of assistance in explaining the operation of the apparatus of FIG. 2.

The electrical wave output of compressor 264 is processed in order to accumulate upon a storage device, for example, conventional capacitor 269, an electrical charge proportional to the frequency irregularity as defined by Equations 2 and 4. In the preferred embodiment shown in FIG. 2, the electrical wave output of compressor 264 is first passed through conventional high-pass filter 265, which has a cut-off frequency on the order of 1 cycle per second or less, thereby eliminating the direct-current component of the wave. Curve A of FIG. 3 shows that the electrical wave output of filter 265 has the same shape as the original wave, and that the amplitude differences between successive maxima and minima are unchanged by the removal of the direct-current component. The output terminal of filter 265 is connected to the input terminal of equalizer 266, for example, a filter with a plus 6 decibels per octave slope, which reduces the magnitudes of the low-frequency components of the wave to a greater extent than the high-frequency components, as illustrated by the solid portion of curve B of FIG. 3. The output terminal of equalizer 266 is connected to full wave rectifier 267, of any suitable variety, which changes the negative loops of the equalized wave into positive loops, as shown by the dashed portion of curve B of FIG. 3. The rectified wave is then passed to resistor 268 and capacitor 269 connected in series, which are proportioned to integrate the rectified wave, thereby accumulating on capacitor 269 a succession of electrical charges proportional to the differences in magnitude between successive peaks of the electrical wave output of filter 265 while the frequency range from $f_a$ to $f_b$ cycles per second is scanned during time interval $t_2 - t_1$. As explained in detail below, equalization of the electrical wave output of filter 265 by equalizer 266 causes the higher frequency portions of the electrical wave to contribute proportionately more to the charge on capacitor 269 per unit of frequency range or per unit of time interval than the low-frequency portions, as required by the definition of frequency irregularity. Thus, at the end of the predetermined time interval, the total charge developed on capacitor 269 as a result of integrating the electrified wave is a function of both the number and the differences in magnitudes of the successive peaks of the electrical wave output of filter 265. Since the peaks of the electrical wave output of filter 265 are proportional to sound pressure maxima and minima at microphone 25, the total charge developed on capacitor 269 at the end of the predetermined time interval is proportional to the frequency irregularity between the selected points in the room, as defined by Equations 2 and 4. At the end of the predetermined time interval, switch 270 is closed in order to connect conventional voltmeter 271 across the terminals of capacitor 269, thereby obtaining an immediate reading of frequency irregularity. Since transmission irregularity and frequency irregularity differ by only a constant, either quantity may be read on voltmeter 271 by suitable calibration of the voltmeter indicator.

Figure 5A:
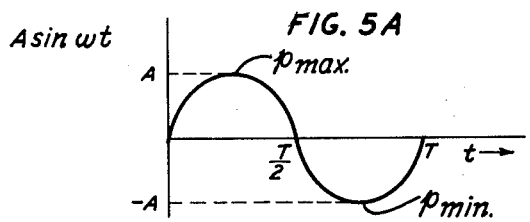
FIGS. 5A, 5B, 6A and 6B are waveform diagrams of assistance in explaining the theory of operation of the apparatus of FIG. 2.
Figure 5B:
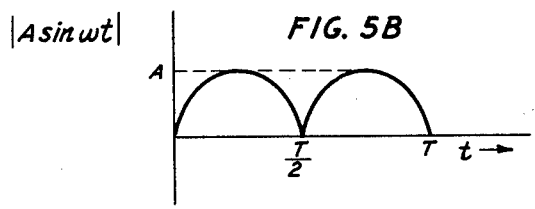

The following example illustrates the manner in which the total charge accumulated on capacitor 269 by integration of the rectified wave is proportional to both the number and the differences in magnitude of successive peaks of the electrical wave output of filter 265. Assume that a portion of the electrical wave is sinusoidal, as shown in FIG. 5A by the curve denoted $A \sin \omega t$. The quantity to be measured by computer 26 is the difference in magnitude between the peak, $p_{max}$, and the following peak, $p_{min}$, where $(p_{max}-p_{min})$ is equal to $2A$. The rectified counterpart of $A \sin \omega t$ is shown in FIG. 5B, and it is evident that integrating over the interval 0 to T the two positive-going peaks of the rectified wave shown in FIG. 5B will accumulate on capacitor 269 a charge proportional to the difference $(p_{max}-p_{min})$ since $$\int_0^T |A \sin \omega t| dt = 2A \int_0^{T/2} \sin \omega t \, dt = -\frac{2A}{\omega} \cos \omega t \Big|_0^{T/2} = \frac{4A}{\omega}$$

where $$\omega = \frac{2\pi}{T}$$

Figure 6A:
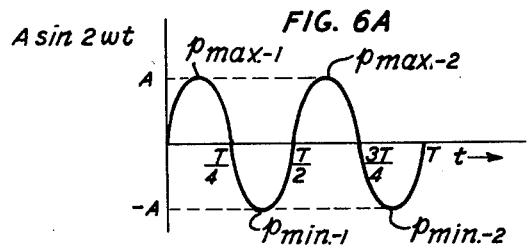
Figure 6B:
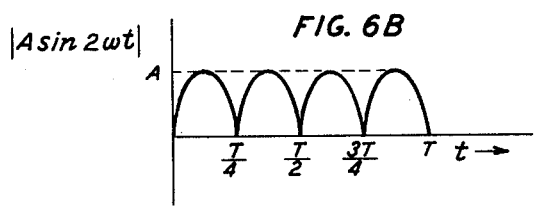

Integration by itself, however, does not take into account the number of peaks in the rectified wave. Thus, FIG. 6A illustrates a sinusoidal portion of the electrical wave, $A \sin 2\omega t$, which has the same magnitude as $A \sin \omega t$ but twice the frequency and therefore twice the number of peaks as $A \sin \omega t$ during the same interval 0 to T. The total of the difference in magnitude between successive peaks of $A \sin 2\omega t$ in the interval 0 to T is $$(p_{max-1}-p_{min-1}+p_{max-2}-p_{min-2})=4A$$

which is twice the difference in magnitude between successive peaks of $A \sin \omega t$ in the interval from 0 to T. But integration of the rectified version of $A \sin 2\omega t$ over the interval 0 to T produces the same charge on capacitor 269 as integration of $A \sin \omega t$, since $$\int_0^T |A \sin 2\omega t| dt = 4A \int_0^{T/4} \sin 2\omega t \, dt$$

$$= -\frac{4A}{\omega}\left[\frac{1}{2} \cos 2\omega t\right]\Big|_0^{T/4} = \frac{4A}{\omega}$$

Since the total difference in magnitude between successive peaks of the wave in FIG. 6A is twice as large as the difference in magnitude between successive peaks of the wave in FIG. 5A, the total charge accumulated on capacitor 269 should be twice as great for a wave $A \sin 2\omega t$ having twice the frequency and the same magnitude as a wave $A \sin \omega t$. It is therefore necessary to process the electrical wave before integration so that high frequency portions of the electrical wave will contribute proportionately more to the charge on capacitor 269 than the low frequency portions of this wave. This is accomplished by equalizer 266, which has a slope or characteristic that causes the magnitudes of low frequency components of the electrical wave to be reduced by a proportionately greater amount than the magnitudes of high frequency components, so that integration of the rectified version of the equalized wave produces a greater charge on capacitor 269 for high frequency portions of the wave than for low frequency portions. Equalizer 266 therefore cooperates with the integrator to accumulate on capacitor 269 a total charge proportional to both the number of peaks and the differences in magnitude between successive peaks of the electrical wave.

Figure 4:
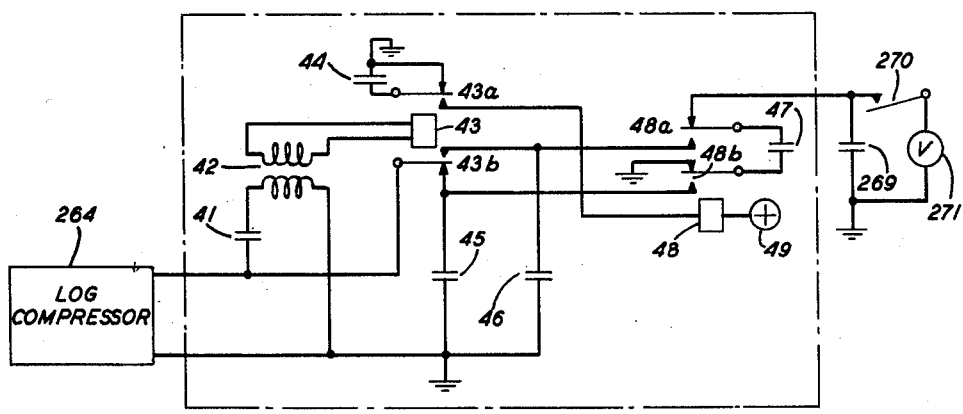
FIG. 4 is a schematic block diagram showing alternative apparatus for computing automatically the frequency irregularity between arbitrarily selected points in a room.

High-pass filter 265, equalizer 266, rectifier 267, and resistor 268 of computer 26 in FIG. 2 may be replaced by the alternative apparatus shown in FIG. 4. Polar relay 43, of any suitable variety, is connected to the output terminals of logarithmic compressor 264 through capacitor 41 and conventional transformer 42. When the amplitude of the electrical wave output of logarithmic compressor 264 is positive going, capacitor 41 and transformer 42 cause contacts 43b of relay 43 to connect capacitor 46 across the output terminals of logarithmic compressor 264 until a maximum in the electrical wave is reached. After a maximum is reached and the amplitude of the electrical wave output of logarithmic compressor 264 becomes negative going, capacitor 41 and transformer 42 cause contacts 43b of relay 43 to disconnect capacitor 46 and connect capacitor 45 across the output terminals of compressor 264 until a minimum in the electrical wave is reached. At the end of a complete cycle of the electrical wave, a complete cycle containing a maximum amplitude followed by a minimum amplitude, the charge on capacitor 46 is proportional to the maximum amplitude of the preceding cycle, whereas the charge on capacitor 45 is of opposite polarity to the charge on capacitor 46 and is proportional to the minimum amplitude of the preceding cycle. At the start of the next cycle, when the amplitude of the electrical wave first becomes positive going, contacts 43a of relay 43 connect capacitor 44 in series with the winding of polar relay 48 and battery 49, thereby operating relay 48 momentarily. The momentary operation of relay 48 causes contacts 48a and 48b to connect capacitor 47 across the terminals of capacitors 45 and 46. Capacitor 47, whose capacitance is small compared to the capacitances of capacitors 45 and 46, becomes charged during this momentary operation of relay 48 with the algebraic sum of the opposite polarity charges on capacitors 45 and 46. Since the charges on capacitors 45 and 46 are proportional to minima and maxima, respectively, of the sound pressure fluctuations, the charge on capacitor 47 at the end of each cycle is proportional to the difference in decibels between a sound pressure maximum and the following sound pressure minimum. After the momentary operation of relay 48, contacts 48a and 48b fall back to connect capacitor 47 in series with large capacitor 269, thereby transferring the charge on capacitor 47 to capacitor 269. This process is repeated for each cycle while the frequency range from $f_a$ to $f_b$ is scanned at a constant rate by oscillator 22 during time $t_2-t_1$; thus the total charge on capacitor 269 at the end of the predetermined time interval is proportional to the sum of the differences in magnitude between successive pairs of maximum and minimum amplitudes of the electrical wave. From Equations 2 and 4, the total charge on capacitor 269 at the end of the predetermined time interval is proportional to the frequency irregularity between the two selected points in the room, and by closing switch 270 at the end of the predetermined time interval, voltmeter 271 is connected across the terminals of capacitor 269 to read automatically the total charge. Voltmeter 271 may be suitably calibrated in units of transmission irregularity or frequency irregularity, as desired, thereby providing a direct reading of either quantity at the end of each frequency scan.

It is to be understood that the arrangements described above are merely illustrative of applications of the principles of the invention. Numerous other arrangements may be devised by those skilled in the art without departing from the spirit and scope of the invention.

What is claimed is:

1. Apparatus for computing automatically the frequency irregularity between two arbitrarily selected points in a room which comprises a source of a sound wave located at one of said points, means for selectively varying the frequency of said sound wave during a predetermined time interval, means responsive to said sound wave for deriving an electrical wave representative of the logarithm of sound pressure fluctuations at the second of said points due to said sound wave, means supplied with said electrical wave for deriving from successive maximum and minimum amplitudes of said electrical wave a succession of proportional electrical charges representative of the differences in magnitude between said successive maximum and minimum amplitudes, and means coacting with said charge deriving means for accumulating upon a storage device said succession of proportional electrical charges during said predetermined time interval.

2. Apparatus for measuring automatically the frequency irregularity between two arbitrarily selected points in a room which comprises a source of a sound wave located at one of said points, means for selectively varying the frequency of said sound wave during a predetermined time interval, means responsive to said sound wave for deriving from the sound pressure at the second of said points an electrical wave whose instantaneous amplitude is proportional to the logarithm of sound pressure fluctuations due to a particular frequency of said sound wave, means actuated by said electrical wave for deriving from each maximum amplitude and the following minimum amplitude of said electrical wave a proportional electrical charge representative of the difference in amplitude between each maximum amplitude and the following minimum amplitude, and means connected to said charge deriving means for storing upon a capacitor each proportional electrical charge derived during said predetermined time interval, whereby at the end of said predetermined time interval the total charge stored upon said capacitor is proportional to the frequency irregularity between said points.

3. Apparatus for determining automatically the frequency irregularity between two arbitrarily selected points in a room which comprises a source of a sound wave located at one of said points, means for selectively varying the frequency of said sound wave during a predetermined time interval, means actuated by said sound wave for deriving from the sound pressure at the second of said points an electrical wave whose amplitude at a given instant is proportional to the logarithm of sound pressure fluctuations due to a particular frequency of said sound wave, means connected to said wave deriving means for eliminating the direct-current component of said electrical wave, means coacting with said direct-current eliminating means for reducing the amplitudes of the low-frequency components of said electrical wave to produce an equalized electrical wave, means supplied with said equalized wave for rectifying said equalized electrical wave, means including a resistor and a capacitor connected in series for integrating said rectified wave to accumulate on said capacitor a succession of electrical charges proportional to the differences in magnitude between successive peaks of said electrical wave, meter means for obtaining from the charges accumulated on said capacitor a direct reading representative of the frequency irregularity between said points and means for connecting said meter means to said capacitor so that at the end of said predetermined time interval said reading on said meter means indicates said frequency irregularity.

4. Apparatus as defined in claim 3 wherein said means for eliminating the direct-current component of said electrical wave comprises a high-pass filter.

5. Apparatus as defined in claim 3 wherein said means for reducing the amplitudes of the low-frequency components of said electrical wave comprises a filter with a minus 6 decibels per octave slope.

6. Apparatus for determining automatically the frequency irregularity between two arbitrarily selected points in a room which comprises a source of a sound wave located at one of said points, means for selectively varying the frequency of said sound wave during a predetermined time interval, means responsive to said sound wave for deriving an electrical wave indicative of the logarithm of sound pressure fluctuations at the second of said points due to said sound wave, means supplied with said electrical wave for accumulating upon a first storage device a charge proportional to each maximum amplitude of said electrical wave and upon a second storage device a charge proportional to the minimum amplitude following each maximum amplitude, wherein the charge accumulated upon said second storage device is opposite in polarity to the charge accumulated upon said first storage device, means connected to said accumulating means for transferring the algebraic sum of the charges on said first and second storage devices to a third storage device after the occurrence of each minimum amplitude of said electrical wave, meter means for obtaining from said algebraic sum of charges transferred to said third storage device a direct reading representative of the frequency irregularity between said points, and means for connecting said meter means to said third storage device so that at the end of said predetermined time interval said reading on said meter means indicates said frequency irregularity.

7. Apparatus as defined in claim 6 wherein said accumulating means comprises a capacitor, a transformer, and a polar relay connected in series.

8. Apparatus as defined in claim 6 wherein said transferring means comprises a first capacitor, a polar relay, and an energy source connected in series, and a second capacitor connected by said polar relay first across the terminals of said first and second storage devices and then in series with said third storage device.

9. The method of measuring automatically the frequency irregularity between two arbitrarily selected points in a room which comprises the steps of generating a sound wave at one of said points, selectively varying the frequency of said sound wave during a predetermined time interval, converting the sound pressure at the second of said points into an electrical wave whose instantaneous amplitude is proportional to the logarithm of said sound pressure due to a particular frequency of said sound wave, measuring the differences in magnitude between successive maximum and minimum amplitudes of said electrical wave, and cumulatively adding said differences during said predetermined time interval.

10. The method of determining automatically the frequency irregularity between two arbitrarily selected points in a room which comprises the steps of generating a sound wave at one of said points, selectively varying the frequency of said sound wave during a predetermined time interval, converting the sound pressure fluctuations at the second of said points due to said sound wave into an electrical wave representative of the logarithm of said sound pressure fluctuations, computing the difference in magnitude between each maximum amplitude and the following minimum amplitude of said electrical wave to obtain a proportional electrical charge, and cumulatively adding each electrical charge derived during said predetermined time interval to obtain a total charge that is proportional to the frequency irregularity between said points.

11. In a system for computing automatically the frequency irregularity between two arbitrarily selected points in a room, the combination that comprises means for generating a sound wave of selectively varying frequency at a first arbitrarily selected point in a room during a predetermined interval of time, means located at a second arbitrarily selected point in a room for converting pressure fluctuations due to said sound wave into electrical signals, means coacting with said converting means for developing from said electrical signals an electrical wave whose amplitude is proportional to the logarithm of the sound pressure fluctuations at said second point, said wave developing means including an amplifier, a rectifier, a low-pass filter, and a logarithmic compressor connected in series, means connected to said wave developing means for removing the direct-current component of said electrical wave, equalizing means cooperating with said direct-current removing means for selectively reducing the magnitudes of the low-frequency components of said electrical wave to produce an equalized wave, means coacting with said equalizing means for converting all negative peaks of said electrical wave into positive peaks to generate a rectified wave, means connected to said rectifying means for obtaining a succession of signals proportional to the differences in amplitude between successive peaks of said rectified wave, means responsive to said succession of signals for cumulatively adding said signals, indicating means actuated by said cumulative adding means, and means for coupling said indicating means to said cumulative adding means at the end of said predetermined interval of time.

References Cited in the file of this patent

UNITED STATES PATENTS

| | | |
|---|---|---|
| 1,871,886 | Inglis et al. | Aug. 16, 1932 |
| 1,907,415 | Carpenter et al. | May 2, 1933 |
| 2,480,607 | Rackey et al. | Aug. 30, 1949 |